US007596302B2

(12) United States Patent
Kato

(10) Patent No.: US 7,596,302 B2
(45) Date of Patent: Sep. 29, 2009

(54) MOBILE TERRESTRIAL DIGITAL BROADCAST RECEIVER

(75) Inventor: Masaru Kato, Higashi-Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 802 days.

(21) Appl. No.: 11/193,386

(22) Filed: Aug. 1, 2005

(65) Prior Publication Data

US 2006/0024028 A1 Feb. 2, 2006

(30) Foreign Application Priority Data

Aug. 2, 2004 (JP) ............................ 2004-225455

(51) Int. Cl.
*H04N 5/76* (2006.01)

(52) U.S. Cl. ........................................ 386/83; 348/553

(58) Field of Classification Search .................. 386/83, 386/124, 46, 95; 725/39, 54, 60, 61; 348/552, 348/553

See application file for complete search history.

(56) References Cited

U.S. PATENT DOCUMENTS 6,169,580 B1 * 1/2001 Shin et al. ................... 348/460
6,470,136 B1 * 10/2002 Kohashi ...................... 386/83
6,588,014 B1 * 7/2003 Hayashi ....................... 725/54
6,822,661 B2 * 11/2004 Sai et al. ..................... 715/716
7,032,236 B1 * 4/2006 Ozkan et al. .................. 725/39
7,054,592 B2 5/2006 Tatsumi et al.
2002/0166128 A1 * 11/2002 Ikeda et al. ................. 725/112
2004/0058656 A1 * 3/2004 Chikaishi .................... 455/130

FOREIGN PATENT DOCUMENTS

JP 05-56364 * 3/1993
JP 2001-77712 * 3/2001
JP 2002-199316 * 7/2002
JP 2003-189267 A 7/2003
JP 2004-23111 A 1/2004

OTHER PUBLICATIONS

Notice of Rejection dated Aug. 29, 2007, issued in corresponding Japanese patent application No. 2004-225455.

* cited by examiner

*Primary Examiner*—David E Harvey
(74) *Attorney, Agent, or Firm*—Westerman, Hattori, Daniels & Adrian, LLP.

(57) ABSTRACT

A mobile terrestrial digital broadcast receiver is disclosed. With the arrival at a predetermined time before the starting time of a recording reserved program specified by arbitrary recording reservation information (hereinafter referred to as the intended recording reservation information), the broadcast is started to be received in preparation for the recording, and it is determined whether the area information contained in the received broadcast wave is identical with the area information in the intended recording reservation information. In the case where the area information contained in the received broadcast wave is different from the area information in the intended recording reservation information, a channel list is prepared, while at the same time determining whether a stream ID in the intended recording reservation information exists in the channel list prepared.

12 Claims, 2 Drawing Sheets

MOBILE TERRESTRIAL DIGITAL BROADCAST RECEIVER

BACKGROUND OF THE INVENTION

1. Field of the Invention

This invention relates to a mobile terrestrial digital broadcast receiver.

2. Description of the Related Art

The contents of the terrestrial digital broadcast are varied from one area to another. In the case where a mobile terrestrial digital broadcast receiver having the video recording function is moved to another area after the recording reservation, therefore, a program different from the reserved one may be undesirably recorded. This is true in both the EPG recording reservation and the recording reservation with the time and the service designated.

SUMMARY OF THE INVENTION

Accordingly, an object of this invention is to provide a mobile terrestrial digital broadcast receiver which, when moved to another area after reserving the recording of a program, is prevented from recording a program different from the reserved one.

Another object of this invention is to provide a mobile terrestrial digital broadcast receiver which, when moved to another area after reserving the viewing of a program, is prevented from displaying a program different from the reserved one.

According to the invention, there is provided a first mobile terrestrial digital broadcast receiver having the recording and reproducing functions, comprising a means for registering the recording reservation information including the area information in addition to the information for specifying a recording reserved program (hereinafter referred to as the recording reserved program specifying information) having a broadcast wave frequency corresponding to the program reserved by the user for recording, a stream ID, a service ID and a program ID, a means for starting the receiving of the broadcast wave in preparation for the video recording and determining whether the area information included in the received broadcast wave is identical with the area information contained in the intended recording reservation information at a predetermined time before starting the recording of a reserved program specified by arbitrary recording reservation information (hereinafter referred to as the intended recording reservation information), a means for selecting a program of which the recording is reserved (hereinafter referred to as the recording reserved program) and starting the video recording based on the recording reserved program specifying information contained in the intended recording reservation information in the case where the area information contained in the received broadcast wave is identical with the area information at the time of the recording reservation, a means for preparing a channel list and determining whether the channel list thus prepared contains the stream ID of the intended recording reservation information in the case where the area information contained in the received broadcast wave is different from the area information in the intended recording reservation information, and a means for tuning to the broadcast frequency of the stream ID in the intended recording reservation information and selecting the recording reserved program based on the service ID and the program ID in the intended recording reserved information thereby to start the video recording in the case where the channel list prepared contains the stream ID of the intended recording reservation information.

Preferably, the first mobile terrestrial digital broadcast receiver according to the invention further comprises a means for indicating that the program specified by the intended recording reservation information cannot be recorded upon determination that the channel list prepared contains no stream ID of the intended recording reservation information.

According to the invention, there is provided a second mobile terrestrial digital broadcast receiver comprising a means for registering the viewing reservation information including the area information in addition to a program of which viewing is reserved (hereinafter referred to as the viewing reserved program specifying information) having the broadcast wave frequency corresponding to the program reserved by the user for viewing, a stream ID, a service ID and a program ID, a means for starting the receiving of the broadcast wave in preparation for the video viewing and determining whether the area information included in the received broadcast wave is identical with the area information contained in the intended viewing reservation information at a predetermined time before starting the viewing of a reserved program specified by arbitrary viewing reservation information (hereinafter referred to the intended viewing reservation information), a means for selecting the viewing reserved program and starting the video display based on the viewing reserved program specifying information contained in the intended viewing reservation information in the case where the area information contained in the received broadcast wave is identical with the area information at the time of the viewing reservation, a means for preparing a channel list and determining whether the channel list thus prepared contains the stream ID in the intended viewing reservation information in the case where the area information contained in the received broadcast wave is different from the area information in the intended viewing reservation information, and a means for tuning to the broadcast frequency of the stream ID in the intended viewing reservation information and selecting the viewing reserved program based on the service ID and the program ID in the intended viewing reservation information thereby to start the video display in the case where the channel list prepared contains the stream ID in the intended viewing reservation information.

Preferably, the second mobile terrestrial digital broadcast receiver according to the invention further comprises a means for indicating that the program specified by the intended viewing reservation information cannot be viewed upon determination that the channel list prepared contains no stream ID in the intended viewing reservation information.

According to the invention, there is provided a recording reservation processing method in a mobile terrestrial digital broadcast receiver having the recording and reproducing functions, comprising steps of registering the recording reservation information including the area information in addition to the information for specifying a recording reserved program (hereinafter referred to as the recording reserved program specifying information) having a broadcast wave frequency corresponding to the program reserved by the user for recording, a stream ID, a service ID and a program ID, starting the receiving of the broadcast wave in preparation for the video recording and determining whether the area information included in the received broadcast wave is identical with the area information contained in the intended recording reservation information at a predetermined time before starting the recording of a reserved program specified by arbitrary recording reservation information (hereinafter referred to as the intended recording reservation information), selecting a program of which the recording is reserved (hereinafter referred to as the recording reserved program) and starting the video recording based on the recording reserved program specifying information contained in the intended recording reservation information in the case where the area information contained in the received broadcast wave is identical with the area information at the time of the recording reservation, preparing a channel list and determining whether the channel list thus prepared contains the stream ID of the intended recording reservation information in the case where the area information contained in the received broadcast wave is different from the area information in the intended recording reservation information, and tuning to the broadcast frequency of the stream ID in the intended recording reservation information and selecting the recording reserved program based on the service ID and the program ID in the intended recording reserved information thereby to start the video recording in the case where the channel list prepared contains the stream ID of the intended recording reservation information.

Preferably, the recording reservation processing method according to the invention further comprises a step of indicating that the program specified by the intended recording reservation information cannot be recorded upon determination that the channel list prepared contains no stream ID of the intended recording reservation information.

According to the invention, there is provided a viewing reservation processing method in a mobile terrestrial digital broadcast receiver, comprising steps of registering the viewing reservation information including the area information in addition to a program of which viewing is reserved (hereinafter referred to as the viewing reserved program specifying information) having the broadcast wave frequency corresponding to the program reserved by the user for viewing, a stream ID, a service ID and a program ID, starting the receiving of the broadcast wave in preparation for the video viewing and determining whether the area information included in the received broadcast wave is identical with the area information contained in the intended viewing reservation information at a predetermined time before starting the viewing of a reserved program specified by arbitrary viewing reservation information (hereinafter referred to the intended viewing reservation information), selecting the viewing reserved program and starting the video display based on the viewing reserved program specifying information contained in the intended viewing reservation information in the case where the area information contained in the received broadcast wave is identical with the area information at the time of the viewing reservation, preparing a channel list and determining whether the channel list thus prepared contains the stream ID in the intended viewing reservation information in the case where the area information contained in the received broadcast wave is different from the area information in the intended viewing reservation information, and tuning to the broadcast frequency of the stream ID in the intended viewing reservation information and selecting the viewing reserved program based on the service ID and the program ID in the intended viewing reservation information thereby to start the video display in the case where the channel list prepared contains the stream ID in the intended viewing reservation information.

Preferably, the viewing reservation processing method according to the invention further comprises a step of indicating that the program specified by the intended viewing reservation information cannot be viewed upon determination that the channel list prepared contains no stream ID in the intended viewing reservation information.

DESCRIPTION OF THE PREFERRED EMBODIMENTS

An embodiment of the invention is explained below with reference to the drawings.

Figure 1:
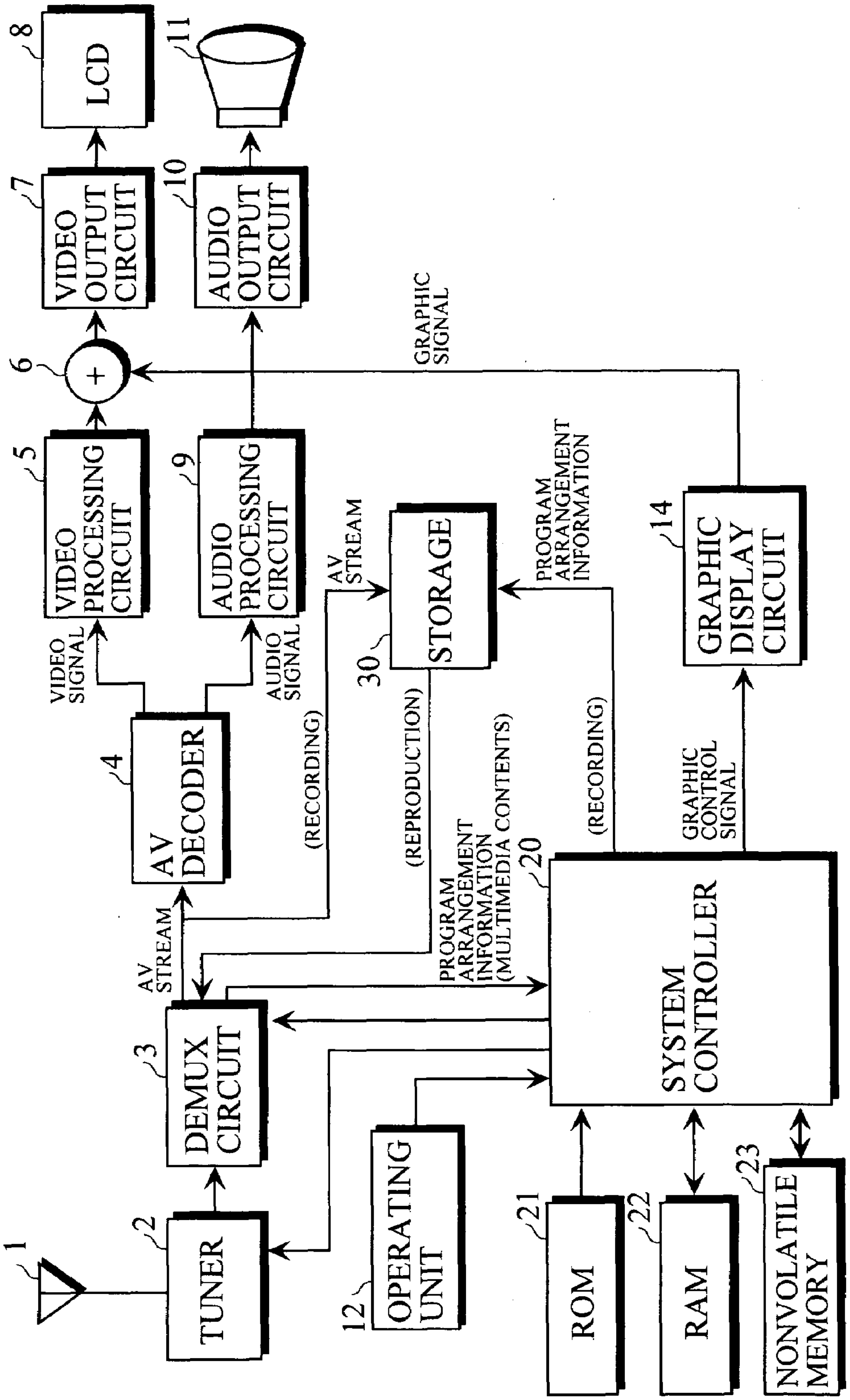
FIG. 1 is a block diagram showing a configuration of a mobile terrestrial digital broadcast receiver having the recording and reproducing functions.

[1] Configuration of Mobile Terrestrial Digital Broadcast Receiver Having the Recording and Reproducing Function FIG. 1 shows a configuration of the mobile terrestrial digital broadcast receiver having the recording and reproducing function.

The terrestrial digital broadcast wave is sent to a tuner 2 through a terrestrial wave antenna 1 and processed as a radio frequency and demodulated. The output from the tuner 2 is sent to a DEMUX circuit 3 and the packets are decoded.

In the DEMUX circuit 3, the packets are separated into an AV stream, a multimedia contents and program arrangement information. The program arrangement information are various information defined in ARIB STD-B10 on the broadcast program transmitted in the digital broadcast. The AV stream separated by the DEMUX circuit 3 is sent to an AV decoder 4. The multimedia contents and the program arrangement information separated by the DEMUX circuit 3 are sent to a system controller 20.

The system controller 20 includes a ROM 21 for storing the program, etc., a RAM 22 for storing the required data and a nonvolatile memory 23 for storing the required data.

The multimedia contents and the program arrangement information sent from the DEMUX circuit 3 are stored in the RAM 22 by the system controller 20. The system controller 20 is supplied with an operation signal from the operating unit 12.

The system controller 20 sends the information, etc. for channel selection to the tuner 2 and the DEMUX circuit 3. Also, a graphic control signal for displaying the multimedia contents, various operating screens, etc. on the LCD 8 is sent to a graphic display circuit 14 by the system controller 20. The graphic display circuit 14 generates the display data such as the multimedia contents, various operating screens, etc. and sends the display data to a multiplexer (combining circuit) 6. The graphic signal sent to the multiplexer 6 is further sent to the LCD 8 through a video output circuit 7.

The AV decoder 4 decodes the AV stream sent from the DEMUX circuit 3. The video signal produced from the AV decoder 4 is sent to the LCD 8 through a video processing circuit 5, the multiplexer 6 and the video output circuit 7. The audio signal produced from the AV decoder 4 is sent to a speaker 11 through an audio processing circuit 9 and an audio output circuit 10.

At the time of recording, the AV stream separated by the DEMUX circuit 3 is stored in a storage 30, and the program arrangement information separated by the DEMUX circuit 3 is stored in the storage 30 such as a nonvolatile memory or a hard disk through the system controller 20.

At the time of reproduction, on the other hand, the AV stream and the program arrangement information stored in the storage 30 are sent to the DEMUX circuit 3. The AV stream received from the storage 30 is sent to the AV decoder 4 and the program arrangement information received from the storage 30 to the system controller 20 by the DEMUX circuit 3.

The AV decoder 4 decodes the AV stream received from the DEMUX circuit 3. The video signal produced from the AV decoder 4 is sent to the LCD 8 through the video processing circuit 5, the multiplexer 6 and the video output circuit 7. The audio signal produced from the AV decoder 4 is sent to the speaker 11 through the audio processing circuit 9 and the audio output circuit 10.

[2] Explanation about Recording Reservation

[2-1] Explanation about Recording Reservation Process

The user can reserve a program for recording by selecting the program desirably reserved for recording from the EPG screen or by designating the service (corresponding to the channel of the analog broadcast) and the time.

In the case where the user has reserved a program for recording, the information for specifying the recording reserved program and the area information (NIT AreaCode) are stored in a nonvolatile memory 23 as recording reservation information by the system controller. The information specifying the recording reserved program includes the frequency (ch) of the broadcast wave, the stream ID (transport_stream_id), the service ID (service_id) and the program ID (event_id). The information specifying the recording reserved program is acquired from the information contained in the program arrangement information.

In the terrestrial digital broadcast, the stream has the same contents (broadcast contents) as long as the stream ID (transport_stream_id) remains the same after changing the area.

[2-2] Explanation about the Recording Process of the Recording Reserved Program

Figure 2:
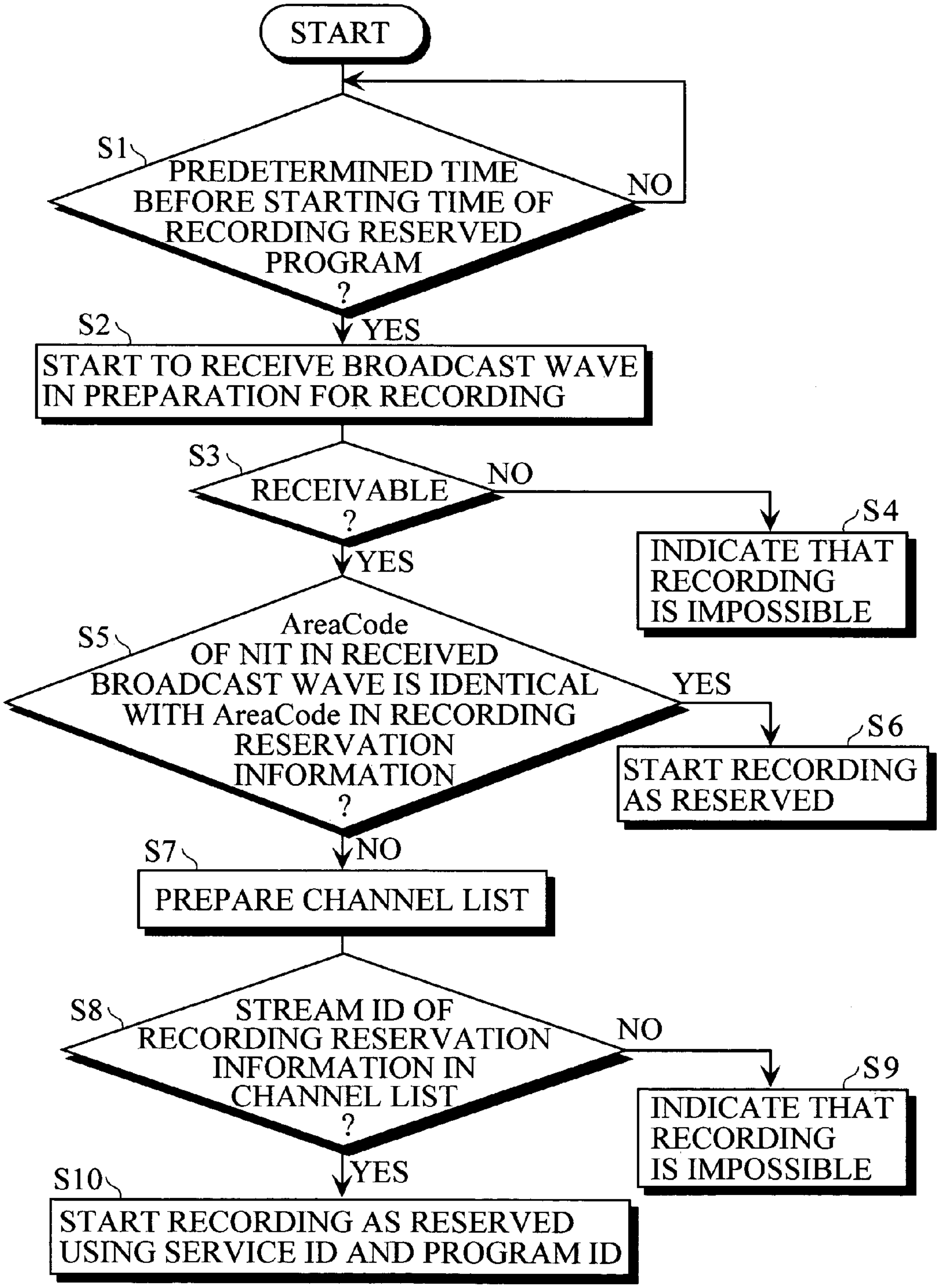
FIG. 2 is a flowchart showing the process of recording a recording reserved program.

FIG. 2 shows the steps of the recording process of a recording reserved program.

Based on the recording reservation information, it is determined whether a predetermined time before starting the recording reserved program has been reached or not (step S1). Once the predetermined time before the starting time of the recording reserved program specified by arbitrary recording reservation information (hereinafter referred to as the intended recording reservation information) is reached, the broadcast begins to be received in preparation for the recording (step S2).

In the case where the broadcast cannot be received (NO at step S3), the impossibility of recording is indicated for a predetermined length of time (step S4), after which the current recording process is terminated. In the case where the broadcast can be received (YES at step S3), on the other hand, it is determined whether the area information (AreaCode) contained in the NIT of the received broadcast wave is identical with the area information (AreaCode) in the intended recording reservation information (area information at the time of the recording reservation) (step S5).

In the case where the area information (AreaCode) contained in the NIT of the received broadcast wave is identical with the area information (AreaCode) in the intended recording reservation information, the recording reserved program is selected based on the information specifying the recording reserved program in the intended recording reservation information and the recording is started (step S6).

In the case where step S5 determines that the area information (AreaCode) contained in the NIT of the received broadcast wave is different from the area information (AreaCode) in the intended recording reservation information, a channel list is prepared by the channel scan (frequency scan) (step S7). The channel list includes receivable frequencies and various information on each receivable frequency. The various information on each receivable frequency, in turn, include the stream ID (transport_stream_id) of the stream broadcast by the particular frequency and the service ID.

Then, it is determined whether the channel list thus prepared includes the stream ID (transport_stream_id) in the intended recording reservation information (step S8). In the case where the stream ID (transport_stream_id) in the intended recording reservation information is not included in the channel list prepared, the impossibility of recording is indicated for a predetermined time length (step S9), after which the current recording process is terminated.

In the case where step S8 determines that the channel list prepared contains the stream ID (transport_stream_id) in the intended recording reservation information, on the other hand, the frequency at which the stream ID (transport_stream_id) in the intended recording reservation information is broadcast is tuned to. At the same time, the recording reserved program is selected based on the service ID (service_id) and the program ID (event_id) in the intended recording reservation information thereby to start the recording operation (step S10).

In the embodiment described above, the recording reservation is explained. Nevertheless, this invention is also applicable to the viewing reservation with equal effect.

What is claimed is:

1. A mobile terrestrial digital broadcast receiver having the recording and reproducing functions, comprising:

means for registering a recording reservation information including an area information in addition to the information for specifying a recording reserved program (hereinafter referred to as the recording reserved program specifying information) having a broadcast wave frequency corresponding to the program reserved by a user for recording, a stream ID, a service ID and a program ID;

means for starting the receiving of the broadcast wave in preparation for a video recording and determining whether the area information included in the received broadcast wave is identical with the area information contained in the intended recording reservation information at a predetermined time before starting the recording of a reserved program specified by an arbitrary recording reservation information (hereinafter referred to as the intended recording reservation information);

means for selecting a program of which the recording is reserved (hereinafter referred to as the recording reserved program) and starting the video recording based on the recording reserved program specifying information contained in the intended recording reservation information in the case where the area information contained in the received broadcast wave is identical with the area information at the time of the recording reservation;

means for preparing a channel list and determining whether the channel list thus prepared contains the stream ID of the intended recording reservation information in the case where the area information contained in the received broadcast wave is different from the area information in the intended recording reservation information; and means for tuning to the broadcast frequency of the stream ID in the intended recording reservation information and selecting the recording reserved program based on the service ID and the program ID in the intended recording reservation information thereby to start the video recording in the case where the channel list prepared contains the stream ID of the intended recording reservation information.

2. A mobile terrestrial digital broadcast receiver according to claim 1, further comprising a means for indicating that the program specified by the intended recording reservation information cannot be recorded upon determination that the channel list prepared contains no stream ID of the intended recording reservation information.

3. A mobile terrestrial digital broadcast receiver comprising:

means for registering a viewing reservation information including an area information in addition to a program of which viewing is reserved (hereinafter referred to as the viewing reserved program specifying information) having a broadcast wave frequency corresponding to the program reserved by a user for viewing, a stream ID, a service ID and a program ID;

means for starting the receiving of the broadcast wave in preparation for a video viewing and determining whether the area information included in the received broadcast wave is identical with the area information contained in the intended viewing reservation information at a predetermined time before starting the viewing of a reserved program specified by an arbitrary viewing reservation information (hereinafter referred to as the intended viewing reservation information);

means for selecting a viewing reserved program and starting a video display based on the viewing reserved program specifying information contained in the intended viewing reservation information in the case where the area information contained in the received broadcast wave is identical with the area information at the time of the viewing reservation;

means for preparing a channel list and determining whether the channel list thus prepared contains the stream ID in the intended viewing reservation information in the case where the area information contained in the received broadcast wave is different from the area information in the intended viewing reservation information; and means for tuning to the broadcast frequency of the stream ID in the intended viewing reservation information and selecting the viewing reserved program based on the service ID and the program ID in the intended viewing reservation information thereby to start the video display in the case where the channel list prepared contains the stream ID in the intended viewing reservation information.

4. A mobile terrestrial digital broadcast receiver according to claim 3, further comprising a means for indicating that the program specified by the intended viewing reservation information cannot be viewed upon determination that the channel list prepared contains no stream ID in the intended viewing reservation information.

5. A recording reservation processing method in a mobile terrestrial digital broadcast receiver having the recording and reproducing functions, comprising steps of:

registering a recording reservation information including an area information in addition to the information for specifying a recording reserved program (hereinafter referred to as the recording reserved program specifying information) having a broadcast wave frequency corresponding to the program reserved by a user for recording, a stream ID, a service ID and a program ID;

starting the receiving of the broadcast wave in preparation for a video recording and determining whether the area information included in the received broadcast wave is identical with the area information contained in the intended recording reservation information at a predetermined time before starting the recording of a reserved program specified by an arbitrary recording reservation information (hereinafter referred to as the intended recording reservation information);

selecting a program of which the recording is reserved (hereinafter referred to as the recording reserved program) and starting the video recording based on the recording reserved program specifying information contained in the intended recording reservation information in the case where the area information contained in the received broadcast wave is identical with the area information at the time of the recording reservation;

preparing a channel list and determining whether the channel list thus prepared contains the stream ID of the intended recording reservation information in the case where the area information contained in the received broadcast wave is different from the area information in the intended recording reservation information; and tuning to the broadcast frequency of the stream ID in the intended recording reservation information and selecting the recording reserved program based on the service ID and the program ID in the intended recording reservation information thereby to start the video recording in the case where the channel list prepared contains the stream ID of the intended recording reservation information.

6. A recording reservation processing method according to claim 5, further comprising a step of indicating that the program specified by the intended recording reservation information cannot be recorded upon determination that the channel list prepared contains no stream ID of the intended recording reservation information.

7. A viewing reservation processing method in a mobile terrestrial digital broadcast receiver, comprising steps of:

registering a viewing reservation information including an area information in addition to a program of which viewing is reserved (hereinafter referred to as the viewing reserved program specifying information) having a broadcast wave frequency corresponding to the program reserved by a user for viewing, a stream ID, a service ID and a program ID;

starting the receiving of the broadcast wave in preparation for a video viewing and determining whether the area information included in the received broadcast wave is identical with the area information contained in the intended viewing reservation information at a predetermined time before starting the viewing of a reserved program specified by an arbitrary viewing reservation information (hereinafter referred to as the intended viewing reservation information);

selecting a viewing reserved program and starting a video display based on the viewing reserved program specifying information contained in the intended viewing reservation information in the case where the area information contained in the received broadcast wave is identical with the area information at the time of the viewing reservation;

preparing a channel list and determining whether the channel list thus prepared contains the stream ID in the intended viewing reservation information in the case where the area information contained in the received broadcast wave is different from the area information in the intended viewing reservation information; and tuning to the broadcast frequency of the stream ID in the intended viewing reservation information and selecting the viewing reserved program based on the service ID and the program ID in the intended viewing reservation information thereby to start the video display in the case where the channel list prepared contains the stream ID in the intended viewing reservation information.

8. A viewing reservation processing method according to claim 7, further comprising a step of indicating that the program specified by the intended viewing reservation information cannot be viewed upon determination that the channel list prepared contains no stream ID in the intended viewing reservation information.

9. A mobile terrestrial digital broadcast receiver having the recording and reproducing functions, comprising:

a unit for registering a recording reservation information including an area information in addition to the information for specifying a recording reserved program (hereinafter referred to as the recording reserved program specifying information) having a broadcast wave frequency corresponding to the program reserved by a user for recording, a stream ID, a service ID and a program ID;

a unit for starting the receiving of the broadcast wave in preparation for a video recording and determining whether the area information included in the received broadcast wave is identical with the area information contained in the intended recording reservation information at a predetermined time before starting the recording of a reserved program specified by an arbitrary recording reservation information (hereinafter referred to as the intended recording reservation information);

a unit for selecting a program of which the recording is reserved (hereinafter referred to as the recording reserved program) and starting the video recording based on the recording reserved program specifying information contained in the intended recording reservation information in the case where the area information contained in the received broadcast wave is identical with the area information at the time of the recording reservation;

a unit for preparing a channel list and determining whether the channel list thus prepared contains the stream ID of the intended recording reservation information in the case where the area information contained in the received broadcast wave is different from the area information in the intended recording reservation information; and a unit for tuning to the broadcast frequency of the stream ID in the intended recording reservation information and selecting the recording reserved program based on the service ID and the program ID in the intended recording reservation information thereby to start the video recording in the case where the channel list prepared contains the stream ID of the intended recording reservation information.

10. A mobile terrestrial digital broadcast receiver according to claim 9, further comprising a unit for indicating that the program specified by the intended recording reservation information cannot be recorded upon determination that the channel list prepared contains no stream ID of the intended recording reservation information.

11. A mobile terrestrial digital broadcast receiver comprising:

a unit for registering a viewing reservation information including an area information in addition to a program of which viewing is reserved (hereinafter referred to as the viewing reserved program specifying information) having a broadcast wave frequency corresponding to the program reserved by a user for viewing, a stream ID, a service ID and a program ID;

a unit for starting the receiving of the broadcast wave in preparation for a video viewing and determining whether the area information included in the received broadcast wave is identical with the area information contained in the intended viewing reservation information at a predetermined time before starting the viewing of a reserved program specified by an arbitrary viewing reservation information (hereinafter referred to as the intended viewing reservation information);

a unit for selecting a viewing reserved program and starting a video display based on the viewing reserved program specifying information contained in the intended viewing reservation information in the case where the area information contained in the received broadcast wave is identical with the area information at the time of the viewing reservation;

a unit for preparing a channel list and determining whether the channel list thus prepared contains the stream ID in the intended viewing reservation information in the case where the area information contained in the received broadcast wave is different from the area information in the intended viewing reservation information; and a unit for tuning to the broadcast frequency of the stream ID in the intended viewing reservation information and selecting the viewing reserved program based on the service ID and the program ID in the intended viewing reservation information thereby to start the video display in the case where the channel list prepared contains the stream ID in the intended viewing reservation information.

12. A mobile terrestrial digital broadcast receiver according to claim 11, further comprising a unit for indicating that the program specified by the intended viewing reservation information cannot be viewed upon determination that the channel list prepared contains no stream ID in the intended viewing reservation information.

* * * * *